D. W. BECKNER.
FLOUR MIXING SIEVE.
APPLICATION FILED MAY 18, 1912.

1,069,101.

Patented Aug. 5, 1913.

Witnesses

D. W. Beckner
Inventor
by C. A. Snow & Co.
Attorneys

UNITED STATES PATENT OFFICE.

DANIEL W. BECKNER, OF LEBANON, MISSOURI, ASSIGNOR OF ONE-HALF TO OSCAR BROWNING, OF LEBANON, MISSOURI.

FLOUR-MIXING SIEVE.

1,069,101.  Specification of Letters Patent.  Patented Aug. 5, 1913.

Application filed May 18, 1912. Serial No. 698,263.

*To all whom it may concern:*

Be it known that I, DANIEL W. BECKNER, a citizen of the United States, residing at Lebanon, in the county of Laclede and State of Missouri, have invented a new and useful Flour-Mixing Sieve, of which the following is a specification.

This invention relates to improvements in flour sifters, which, however, is adapted for sifting other analogous materials.

The invention has for its object to provide for effectively sifting the flour and to effect the thorough intermixing of the sifted flour and the usual ingredients employed to render it suitable for baking purposes, as well understood.

A further object is to carry out these ends in a simple, inexpensive and expeditious manner.

The invention consists of certain instrumentalities and features substantially as hereinafter fully disclosed and defined by the appended claim.

The accompanying drawing illustrates the preferred embodiment of my invention.

It is understood that various changes and modifications may be made as to the detailed construction and arrangement of the parts without departing from the spirit thereof.

Figure 1:
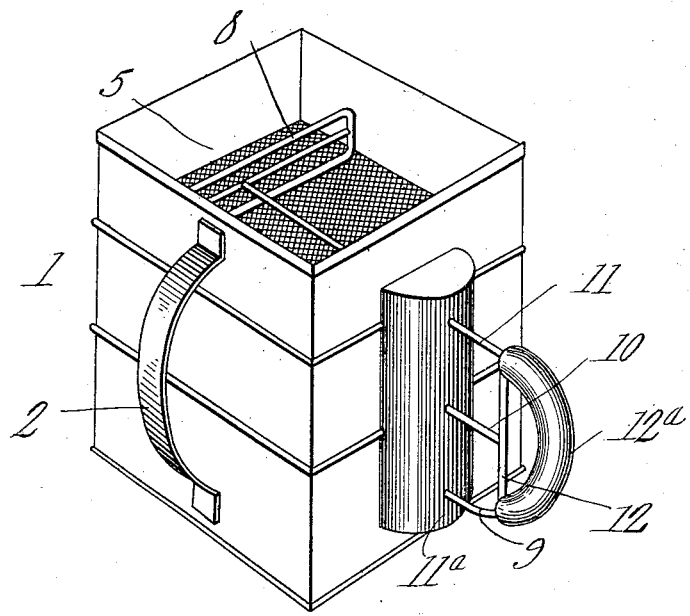
Figure 2:
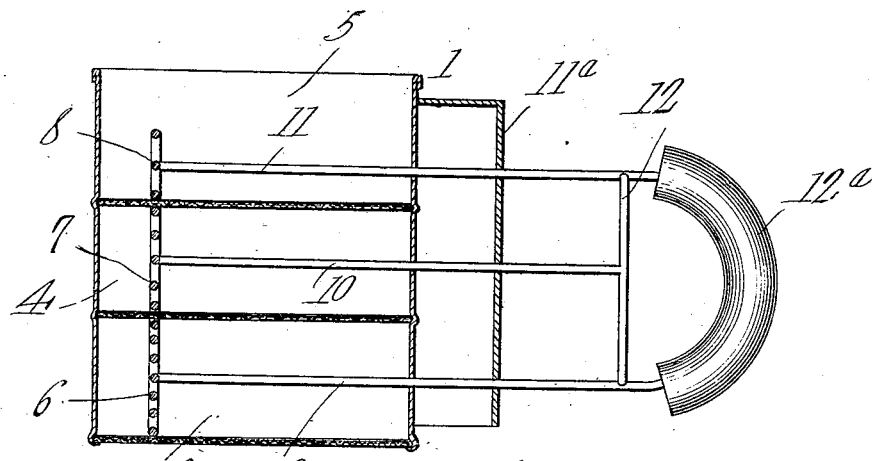

In the drawings,—Figure 1 is a perspective view of the sifter. Fig. 2 is a central vertical section thereof.

In carrying out my invention, I provide a suitable receptacle 1 of any desired outline or shape and convenient size or capacity, the same also being provided with a handle 2. Said receptacle is sub-divided into sundry horizontal compartments or chambers, preferably three, designated as 3, 4 and 5, respectively, the bottoms of said compartments or chambers being foraminous or finely perforated for obvious reasons. The first of these chambers or compartments initially receives the flour, or other material, and the ingredients which may be employed in connection therewith, as usual, in preparing the same for conversion, or making into bread. These chambers or compartments are superposed with respect to each other, the two lower ones being adapted to receive the sifting flour successively as it is agitated in the initial or topmost chamber or compartment. In these chambers or compartments are arranged agitators which are preferably edgewise-disposed frames designated as 6, 7 and 8, respectively one being received by each chamber or compartment, and to these agitators or plates are centrally secured operating stems or rods 9, 10 and 11, respectively, extending through apertures in one side of the receptacle 1, and additionally, or preferably through a reinforcing part or brace 11ᵃ suitably secured to the receptacle. These stems or rods are connected fixedly together for the common or simultaneous actuation or movement of said agitators, by the hand, the uniting member between the outer ends of said stems or rods which is preferably a frame-like member 12 being suitably adapted having a finger or hand-hold 12ᵃ applied thereto for convenient grasping by the hand.

It will be noted that, with the flour or material placed in the initial or topmost chamber or compartment, together with the ingredients, as above indicated, and by grasping the hand-hold, the rods or stems of the agitators 6, 7 and 8, the contents of said initial chamber will be sifted through its foraminous bottom, into the next chamber or compartment below, and that the sifted contents of this second compartment will be agitated or sifted by its agitator through the foraminous bottom of said chamber into the next or third compartment, the contents of this third compartment being delivered or sifted through the foraminous bottom thereof, thus providing, as is apparent, for the effective sifting of the flour and the thorough intermixing of the flour and the ingredients as desired.

This device, it will be noted, is exceedingly simple, economic in construction, and effective in operation.

What is claimed is:—

A sieve, having an open upper end casing divided into a plurality of superposed chambers by screen partitions, a projection semicircular in cross section carried upon one side of the casing, a plurality of rods, one to each chamber slidably mounted through the projection and the wall of the casing adjacent the respective chambers, a screen scraping and material agitating member carried upon the inner end of each rod within the casing, the intermediate lower members each being in scraping contact with its respective upper and lower screen partitions, the extreme upper or lower rods being longer than the intermediate one, and a handle connected to the slidable rods.

In testimony that I claim the foregoing as my own, I have hereto affixed my signature in the presence of two witnesses.

DANIEL W. BECKNER.

Witnesses:
 Don O. Vernon,
 A. W. Curry.

Copies of this patent may be obtained for five cents each, by addressing the "Commissioner of Patents, Washington, D. C."